(12) United States Patent
Reed, IV et al.

(10) Patent No.: US 8,379,771 B1
(45) Date of Patent: Feb. 19, 2013

(54) SYSTEM AND METHOD FOR FORMATTING SYMBOLS IN A DATA STREAM

(75) Inventors: Alex C. Reed, IV, Atlanta, GA (US); Shriram Kulkarni, Duluth, GA (US)

(73) Assignee: Integrated Device Technology, Inc., San Jose, CA (US)

(*) Notice: Subject to any disclaimer, the term of this patent is extended or adjusted under 35 U.S.C. 154(b) by 345 days.

(21) Appl. No.: 12/876,988

(22) Filed: Sep. 7, 2010

(51) Int. Cl.
*H04L 27/06* (2006.01)

(52) U.S. Cl. ........ 375/340; 375/371; 375/355; 375/373; 375/374; 375/354; 341/100; 341/101; 327/235; 327/156; 327/292; 327/407; 327/158; 327/152; 327/153

(58) Field of Classification Search .............. 375/340, 375/371, 355, 373, 374, 354; 341/100, 101; 327/235, 156, 292, 407, 158, 152, 153
See application file for complete search history.

*Primary Examiner* — Siu Lee
(74) *Attorney, Agent, or Firm* — Kenneth Glass; Stanley J. Pawlik; Glass & Associates

(57) ABSTRACT

A data receiver identifies an alignment symbol in a parallel data stream including encoded symbols, generates a bit order indicator indicating a bit order of the alignment symbol identified in the parallel data stream, and generates a symbol stream including the encoded symbols. Further, the data receiver decodes symbols in the symbol stream and generates a bit polarity indicator indicating a bit polarity of the parallel data stream based on the decoded symbols. Additionally, the data receiver generates a formatted symbol stream having a predetermined bit order and a predetermined bit polarity, based on the symbol stream, the bit order indicator, and the bit polarity indicator. In some embodiments, the data receives a serial data stream and generates the parallel data stream by deserializing data in the serial data stream.

20 Claims, 9 Drawing Sheets

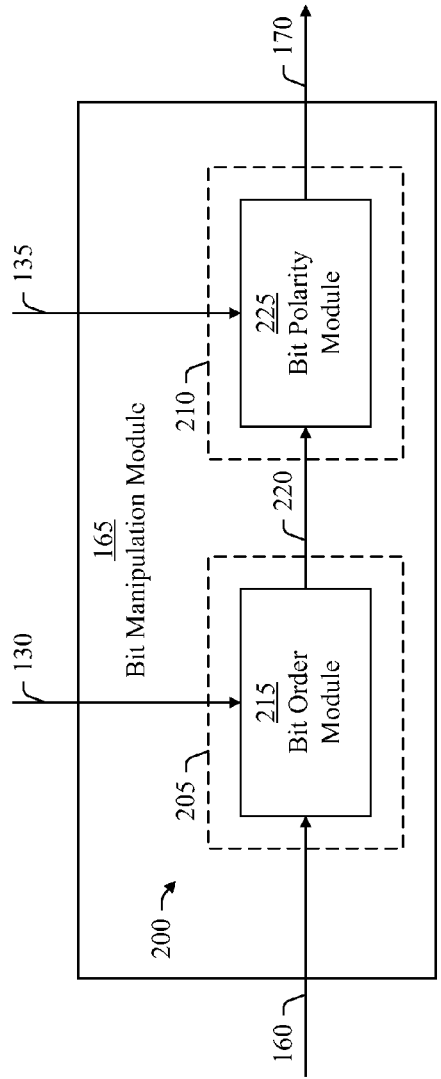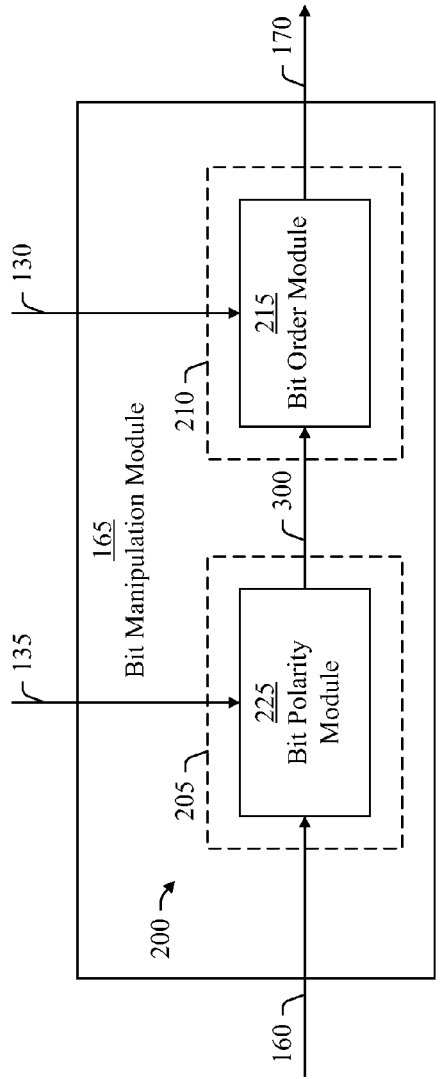

SYSTEM AND METHOD FOR FORMATTING SYMBOLS IN A DATA STREAM

BACKGROUND

A typical serial communication system includes a serial data transmitter and a serial data receiver. The serial data transmitter generates a serial data stream including the data symbols, and transmits the serial data stream to a serial data receiver. The serial data receiver receives the serial data stream, converts the serial data stream into a parallel data stream, and generates a symbol stream by aligning symbols in the parallel data stream. In this way, the serial data receiver recovers the original data symbols in the serial data stream generated by the serial data transmitter.

In some types of serial communication systems, a serial data transmitter encodes data using an 8b/10b line code. In this process, a serial data transmitter encodes 8-bit data symbols into corresponding 10-bit data symbols and generates a serial data stream including the encoded data symbols. Additionally, the serial data transmitter generates 10-bit control symbols and embeds the control symbols in the serial data stream. For example, a control symbol may be an alignment symbol defining an alignment boundary in the serial data stream. In these types of communication systems, the serial data receiver aligns encoded data symbols in the parallel data stream based on alignment symbols in the parallel data stream. Moreover, the serial data receiver decodes the encoded data symbols recovered from the serial data stream by converting the encoded data symbols back into the original 8-bit data symbols.

Although many serial communication systems have successfully employed an 8b/10b line code for encoding data, the format of data symbols and control symbols differ among serial communication systems. Some types of serial communication systems employ a little-endian format for a serial data stream in which a least significant bit of a symbol precedes a most significant bit of the symbol in the serial data stream. Other types of serial communication systems employ a big-endian format for a serial data stream in which a most significant bit of a symbol precedes a least significant bit of the symbol in the serial data stream. Furthermore, a bit polarity of symbols may be negated in a serial data stream. For example, a receiver may receive a serial data stream over a differential pair of wires that are inadvertently reversed causing an inverted polarity format in which each bit of the serial data stream is logically negated. Because of these various formats for a serial data stream, a serial data transmitter may not be compatible with a serial data receiver.

SUMMARY

In various embodiments, a data receiver includes a deserializer, a symbol alignment module, a decode module, and a format module. The deserializer receives a serial data stream including encoded symbols and generates a parallel data stream including the encoded symbols. The symbol alignment module identifies an alignment symbol in the parallel data stream and generates a symbol stream by aligning encoded symbols in the parallel data stream based on the alignment symbol identified in the parallel data stream. The alignment symbol identified in the parallel data stream may have a forward bit order or a reverse bit order. The symbol alignment module generates an alignment symbol indicator indicating a bit order of the alignment symbol identified in the parallel data stream. The decode module decodes symbols in the symbol stream generated by the alignment module and generates a symbol validity indicator indicating whether the symbol stream is valid. The format module determines the bit order of the parallel data stream based on the alignment symbol indicator and determines the bit polarity of parallel data stream based on the symbol validity indicator. Further, the format module generates a symbol stream having both a predetermined bit order and predetermined bit polarity of the data receiver by selectively modifying data bits in the symbol stream generated by the alignment module. The decode module generates a formatted symbol stream having the predetermined bit order and the predetermined bit priority by decoding symbols in the symbol stream generated by the format module.

The data receiver generates the formatted symbol stream having the predetermined bit order and the predetermined bit polarity regardless of whether symbols in the parallel data stream are forward symbols having a forward bit order or reverse symbols having a reverse bit order. Furthermore, the data receiver generates the formatted symbol stream having the predetermined bit order and the predetermined bit polarity regardless of whether symbols in the parallel data stream are non-inverted symbols having a non-inverted bit polarity or inverted symbols having an inverted bit polarity. In this way, the data receiver transforms the parallel data stream to the formatted symbol stream. Because the data receiver transforms a parallel data stream to a formatted symbol stream without requiring user input, the data receiver provides functionality not found in other data receivers.

A system for formatting symbols in a data stream, in accordance with one embodiment, includes a symbol alignment module, a decode module, and a format module. The format module is coupled to the symbol alignment module and the decode module. The symbol alignment module is configured to receive a parallel data stream and identify an alignment symbol in the parallel data stream. The symbol alignment module is also configured to identify symbols in the parallel data stream based on the alignment symbol identified in the parallel data stream and generate a symbol stream by aligning the symbols identified in the parallel data stream. The decode module is configured to decode symbols in the symbol stream. The format module is configured to generate a bit order indicator indicating a bit order of the parallel data stream based on the alignment symbol identified in the parallel data stream. Additionally, the format module is configured to generate a bit polarity indicator indicating a bit polarity of the parallel data symbol stream based on the decoded symbols. The decode module is further configured to generate a formatted symbol stream having the predetermined bit polarity and the predetermined bit order, based on the symbol stream, the bit order indicator, and the bit polarity indicator.

A method of formatting symbols in a data stream, in accordance with one embodiment, includes receiving a parallel data stream, identifying an alignment symbol in the parallel data stream, and generating a bit order indicator indicating a bit order of the alignment symbol identified in the parallel data stream. Further, the method includes identifying symbols in the parallel data stream based on the alignment symbol identified in the parallel data stream and generating a symbol stream by aligning the symbols identified in the parallel data stream. Additionally, the method includes decoding symbols in the symbol stream and generating a bit polarity indicator indicating a bit polarity of the parallel data stream based on the decoded symbols. The method also includes generating a formatted symbol stream having a predetermined bit polarity and a predetermined bit order, based on the symbol stream, the bit order indicator, and the bit polarity indicator.

A method of formatting symbols in a data stream, in accordance with one embodiment, includes receiving a parallel data stream. The method also includes identifying an alignment symbol in the parallel data stream by identifying either a forward alignment symbol having a forward bit order in the parallel data stream or a reverse alignment symbol having a reverse bit order in the parallel data stream. Further, the method includes generating a bit order indicator indicating whether the parallel data stream has a forward bit order or a reverse bit order based on the alignment symbol identified in the parallel data stream. The method also includes identifying symbols in the parallel data stream based on the alignment symbol identified in the parallel data stream and generating a symbol stream by aligning the symbols identified in the parallel data stream. Additionally, the method includes decoding symbols in the symbol stream and generating a bit polarity indicator indicating whether the parallel data stream has a non-inverted bit polarity or an inverted bit polarity. Additionally, the method includes generating a formatted symbol stream having a predetermined bit order and a predetermined bit order based on the symbol stream, the bit order indicator, and the bit polarity indicator.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2 is a block diagram of a bit manipulation module, in accordance with an embodiment of the present invention.

FIG. 3 is a block diagram of a bit manipulation module, in accordance with an embodiment of the present invention.

DETAILED DESCRIPTION

In various embodiments, a data receiver identifies an alignment symbol in a parallel data stream including encoded symbols, generates a bit order indicator indicating a bit order of the alignment symbol identified in the parallel data stream, and generates a symbol stream including the encoded symbols. Additionally, the data receiver decodes symbols in the symbol stream and generates a bit polarity indicator indicating a bit polarity of the parallel data stream based on the decoded symbols. Further, the data receiver generates a formatted symbol stream having a predetermined bit order and a predetermined bit polarity, based on the symbol stream, the bit order indicator, and the bit polarity indicator. Moreover, the data receiver automatically generates the formatted symbol stream without a need for user input.

Figure 1:
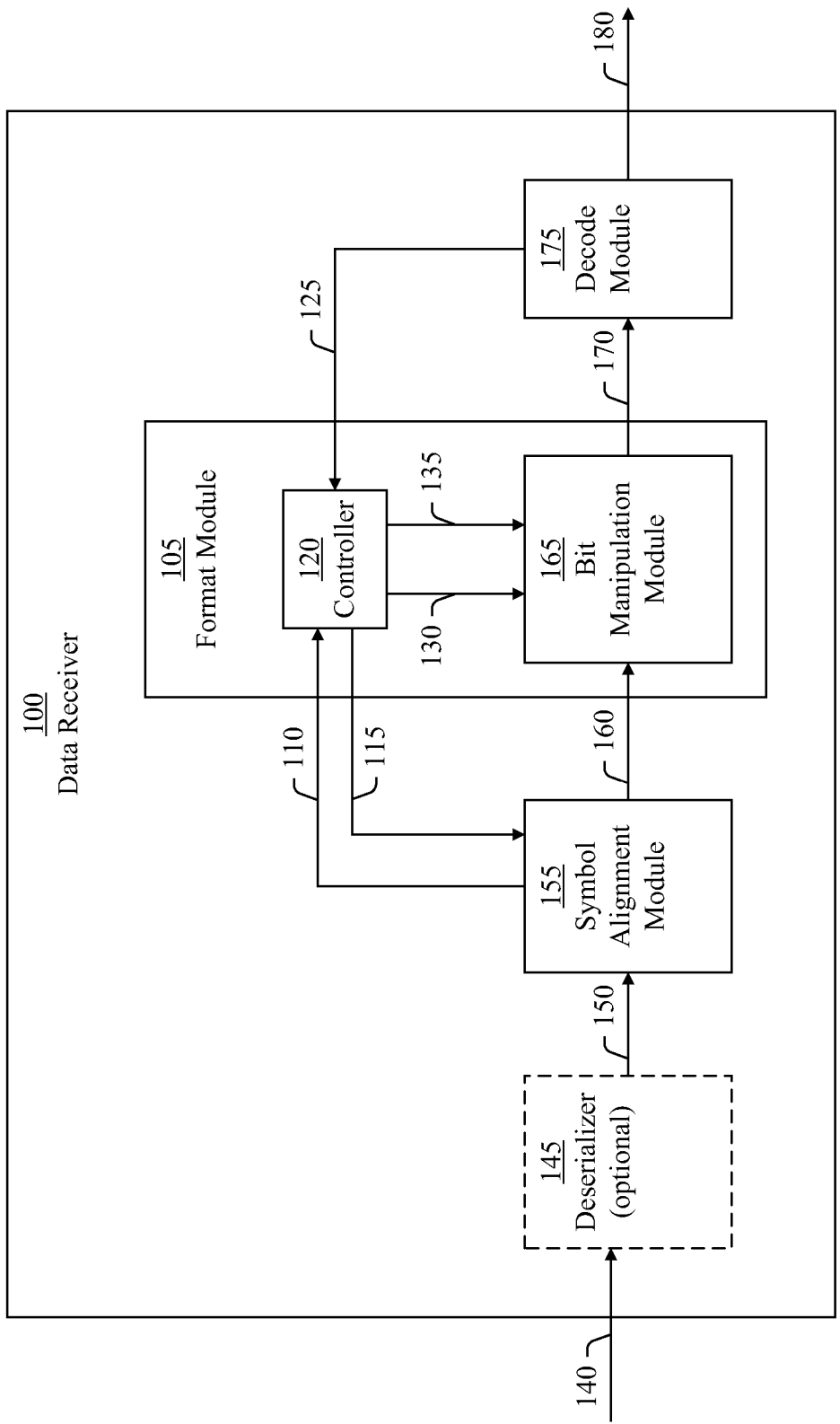
FIG. 1 is a block diagram of a data receiver, in accordance with an embodiment of the present invention.

FIG. 1 illustrates a data receiver 100, in accordance with an embodiment of the present invention. The data receiver 100 includes a format module 105, an optional deserializer 145, a symbol alignment module 155, and a decode module 175. The deserializer 145 is coupled (e.g., connected) to the symbol alignment module 155. The format module 105 is coupled (e.g., connected) to both the symbol alignment module 155 and the decode module 175. Additionally, the symbol alignment module 155 is coupled to the decode module 175 through the format module 105.

In various embodiments, the deserializer 145 receives a serial data stream 140 including symbols (e.g., encoded data symbols). The deserializer 145 generates a parallel data stream 150 based on the serial data stream 140 and including the symbols of the serial data stream 140. In this way, the deserializer 145 deserializes the serial data stream 140. The symbols in the serial data stream 140 and the parallel data stream 150 may have various symbol formats defined by a bit order and a bit polarity.

The bit order of a symbol defines a bit order of data bits in the symbol, which may be a forward bit order or a reverse bit order. For example, a symbol having a forward bit order (i.e., a little endian format) may have a sequence of data bits including a least significant data bit that precedes a most significant data bit in the serial data stream 140. In this example, a symbol having a reverse bit order (i.e., a big endian) has a sequence of data bits including a most significant data bit that precedes a least significant data bit in the serial data stream 140. In various embodiments, the format module 105 selectively transforms a symbol having a forward bit order (i.e., a forward symbol) into a symbol having a reverse bit order (i.e., a reverse symbol) by reversing the data bits in the symbol, as is described more fully herein. Similarly, the symbol alignment module 155 selectively transforms a symbol having a reverse bit order into a symbol having a forward bit order by reversing the data bits in the symbol, as is also described more fully herein.

In various embodiments, the symbol alignment module 155 identifies symbols (e.g., encoded data symbols) in the parallel data stream 150, aligns the symbols, and generates a symbol stream 160 including the aligned symbols. The format module 105 generates a symbol stream 170 based on the symbol stream 160 by selectively modifying the bit order or the bit polarity of symbols in the symbol stream 160, or both. The decode module 175 decodes symbols (i.e., encoded symbols) in the symbol stream 170 generated by the format module 105, and generates a formatted symbol stream 180 including the symbols (i.e., the decoded symbols). Moreover, the symbols in the formatted symbol stream 180 have a predetermined bit order and a predetermined bit polarity of the data receiver 100.

The format module 105 determines the bit order and the bit priority of the parallel data stream 150 and generates the formatted symbol stream 180 without a need for user input to the data receiver 100. In this way, the data receiver 100 automatically generates the formatted symbol stream 180. As further discussed herein, the predetermined bit order may be a forward bit order or a reverse bit order, and the predetermined bit polarity may be a non-inverted bit polarity or an inverted bit polarity. A symbol having a forward bit order and a non-inverted bit polarity is referred to as a non-inverted forward symbol. A symbol having a forward bit order and an inverted bit polarity is referred to as an inverted forward symbol. A symbol having a reverse bit order and a non-inverted bit polarity is referred to as a non-inverted reverse symbol. A symbol having a reverse bit order and an inverted bit polarity is referred to as an inverted reverse symbol.

In various embodiments, the symbol alignment module 155 identifies an alignment symbol in the parallel data stream 150 and generates an alignment symbol indicator 110 indicating that the parallel data stream 150 includes an alignment symbol. In turn, the format module 105 determines based on the alignment symbol indicator 110 generated by the symbol alignment module 155 whether the alignment symbol identified in the parallel data stream 150 is a forward alignment symbol (i.e., an alignment symbol having a forward bit order) or a reverse alignment symbol (i.e., an alignment symbol having a reverse bit order).

In these embodiments, the decode module 175 generates a symbol validity indicator 125 indicating whether the formatted symbol stream 180 generated by the decode module 175 is valid. In various embodiments, the decode module 175 identifies invalid symbols in the symbol stream 170 according to a communication protocol of the data receiver 100. For example, the decode module 175 may determine whether a 10-bit encoded symbol in the symbol stream 170 is a valid symbol according to an 8b/10b line code. Further, the decode module 175 maintains a count of invalid symbols identified in the symbol stream 170 in a time period (e.g., a predetermined time period) and determines whether the count has reached a threshold value in that time period. If the count has not reached the threshold in the time period, the decode module 175 generates the symbol validity indicator 125 indicating that the formatted symbol stream 180 is valid. Otherwise, if the count has reached the threshold in the time period, the decode module 175 generates the symbol validity indicator 125 indicating formatted symbol stream 180 is not valid (i.e., invalid).

For example, the data receiver 100 may receive the serial data stream 140 at a rate of seven-hundred twenty megabits per second (720 Mbps) and the symbol alignment module 155 may count a number of alignment symbols occurring in the parallel data stream 150 in a time period of two microseconds (2 us). In this example, the symbol alignment module 155 counts the number of alignment symbols occurring in preamble symbol pattern having a sequence of twelve symbols in the parallel data stream 150. If the symbol alignment module 155 counts at least six alignment symbols in the time period, the symbol alignment module 155 determines that the parallel data stream 150 includes an alignment symbol. Further in this example, the decode module 175 may count a number of invalid symbols occurring in a time period of two microseconds (2 us). In this example, the threshold value of the decode module 175 is equal to one. Moreover, the threshold value is reached at an invalid symbol error rate of approximately eight percent (i.e., 1/12).

The format module 105 generates the symbol stream 170 including the predetermined bit order and the predetermined bit polarity by selectively modifying data bits in the symbol stream 160 received from the symbol alignment module 155 based on the alignment symbol indicator 110 generated by the symbol alignment module 155 and the symbol validity indicator 125 generated by the decode module 175. The decode module 175 decodes symbols in the symbol stream 170 generated by the format module 105 and generates the formatted symbol stream 180 including the decoded symbols. The decoded symbols in the formatted symbol stream 180 generated by the decode module 175 have the same predetermined bit order and the same predetermined bit polarity of the encoded symbols in the symbol stream 170 generated by the format module 105. In this way, the formatted symbol stream 180 generated by the decode module 175 has the predetermined bit order and the predetermined bit polarity of the data receiver 100.

In one embodiment, the format module 105 includes a controller 120 and a bit manipulation module 165 coupled to the controller 120. The controller 120 generates a bit order selector 115 indicating the predetermined bit order of the data receiver 100, and the symbol alignment module 155 monitors the parallel data stream 150 for an alignment symbol having the predetermined bit order indicated by the bit order selector 115. For example, the format module 105 may generate a bit order selector 115 indicating a forward bit order. Further, the symbol alignment module 155 generates the alignment symbol indicator 110 indicating whether the parallel data stream 150 includes an alignment symbol having a forward bit order. The controller 120 monitors the alignment symbol indicator 110 for up to a predetermined time period to determine whether the parallel data stream 150 includes an alignment symbol having the predetermined bit order indicated by the bit order selector 115. If the alignment symbol indicator 110 indicates the parallel data stream 150 includes an alignment symbol having the predetermined bit order indicated by the bit order selector 115 before the predetermined time period expires, the controller 120 generates a bit order indicator 130 indicating the bit order (e.g., a forward bit order) of the alignment symbol. Otherwise, if the predetermined time period expires without the alignment symbol indicator 110 indicating that the parallel data stream 150 includes an alignment symbol, the controller 120 generates the bit order selector 115 indicating an opposite bit order (e.g., a reverse alignment symbol). In turn, the symbol alignment module 155 monitors the parallel data stream 150 for an alignment symbol having the opposite bit order (e.g., a reverse bit order) and generates the alignment symbol indicator 110 indicating whether the parallel data stream 150 includes an alignment symbol having the opposite bit order. The controller 120 monitors the alignment symbol indicator 110 for up to a predetermined time period to determine whether the parallel data stream 150 includes an alignment symbol having the opposite bit polarity. If the alignment symbol indicator 110 indicates the parallel data stream 150 includes an alignment symbol before the predetermined time period expires, the controller 120 determines that the parallel data stream 150 includes an alignment symbol having the bit order indicated by the bit order selector 115 (e.g., a reverse bit order) and generates a bit order indicator 130 indicating the bit order (e.g., a reverse bit order) of the alignment symbol. Moreover, the bit manipulation module 165 reverses the bit order of symbols in the symbol stream 170 by modifying data bits in the symbol stream 160 received from the symbol alignment module 155. In this way, the bit manipulation module 165 generates the symbol stream 170 having the predetermined bit order (e.g., a forward bit order).

Also in this embodiment, the decode module 175 monitors the symbol stream 170 for invalid symbols. For example, the decode module 175 may monitor the symbol stream 170 for invalid 10-bit encoded symbols of an 8b/10b line code. The decode module 175 generates the symbol validity indicator 125 indicating whether the symbol stream 170 is valid, as is discussed more fully herein. The controller 120 monitors the symbol validity indicator 125 for up to a predetermined time period to determine whether the symbol stream 170 is valid. If the symbol validity indicator 125 indicates the symbol stream 170 is valid upon expiration of the predetermined time period, the controller 120 generates a bit polarity indicator 135 indicating the bit polarity of the symbol stream 170 is the predetermined bit polarity (e.g., a non-inverted bit polarity) of the data receiver 100. Moreover, both the symbol stream 170 and the formatted symbol stream 180 have the predetermined bit polarity of the data receiver 100.

Otherwise, if the decode module 175 determines within the predetermined time period that the formatted symbol stream 180 is not valid (i.e., invalid), the controller 120 generates the bit polarity indicator 135 indicating an opposite bit polarity (e.g., an inverted bit polarity) of the predetermined bit polarity of the data receiver 100. In turn, the bit manipulation module 165 modifies data bits in the symbol stream 160 to invert the bit polarity of the symbol stream 170. As a result, both the symbol stream 170 and the formatted symbol stream 180 have the predetermined bit polarity of the data receiver 100.

Because the data receiver 100 generates the formatted symbol stream 180 having a predetermined bit order and a predetermined bit polarity even though the serial data stream 140 or the parallel data stream 150 does not have the same bit order or the same bit polarity, the data receiver 100 may be employed in communication systems having various communication protocols or variants of the same communication protocol. In particular, the data receiver 100 may be employed in communication systems in which the bit order of a parallel data stream 150 is reversed wither respect to the predetermined bit order of the data receiver 100 or the bit polarity of the parallel data stream 150 is inverted with respect to the predetermined bit polarity of the data receiver 100, or both. Moreover, the data receiver 100 does not require user input indicating whether the bit order of the serial data stream 140 or the parallel data stream 150 is reversed with respect to the predetermined bit order of the data receiver 100 or user input indicating whether the bit polarity of the serial data stream 140 or the parallel data stream 150 is inverted with respect to the predetermined bit polarity of the data receiver 100.

In various embodiments, the deserializer 145 generates the parallel data stream 150 by grouping consecutive data bits of the serial data stream 140 into data units and outputting the data units. For example, the deserializer 145 may group a predetermined number of consecutive data bits in the serial data stream 140 into a data unit and output the data unit. Further in this example, the deserializer 145 may repeat the grouping process to generate the parallel data stream 150 including data units, each of which has the predetermined number of data bits. Moreover, the data units represent data symbols as well as control symbols for performing functions on the data symbols. For example, a control symbol may be an alignment symbol preceding or succeeding a data symbol for aligning the data symbol to other data symbols in the serial data stream 140.

In some cases, each data unit in the parallel data stream 150 represents a corresponding symbol. In these cases, symbols in the parallel data stream 150 are aligned. In other cases, a symbol is represented by portions of successive data units in the parallel data stream 150. In these cases, symbols in the parallel data stream 150 are not aligned. Whether symbols are aligned in the parallel data stream 150 or symbols are not aligned in the parallel data stream 150, the symbol alignment module 155 generates the symbol stream 160 such that symbols are aligned in the symbol stream 160.

In various embodiments, the serial data stream 140 includes 10-bit encoded data symbols representing 8-bit data symbols. In addition to the 10-bit encoded data symbols, the serial data stream 140 includes 10-bit control symbols for performing functions related to the encoded data symbols. For example, the serial data stream 140 may include data symbols encoded by using a well known 8b/10b line code as well as 10-bit control symbols represented in the 8b/10b line code. In this way, the serial data stream 140 is encoded in the 8b/10b line code and the communication protocol of the data receiver 100 includes decoding 10-bit symbols into 8-bit symbols according to the 8b/10b line code. In these embodiments, the control symbols in the serial data stream 140 include alignment symbols for aligning the encoded data symbols in the serial data stream 140. For example, the alignment symbol may be a comma symbol, such as a K.28.5 control symbol of an 8b/10b line code.

In other embodiments, the serial data stream 140 may be encoded in a line code in which data symbols have more or fewer than 8 bits, and encoded data symbols and control symbols have more or fewer than 10 bits. For example, the serial data stream 140 may be encoded in a 3b/4b line code or a 5b/6b line code. In embodiments including the deserializer 145, the data receiver 100 receives the serial data stream 140. In embodiments without the deserializer 145, the data receiver 100 receives the parallel data stream 150.

In some embodiments, the data receiver 100 is implemented in an integrated circuit of an integrated circuit device which may include an integrated circuit package containing the integrated circuit. In some embodiments, the data receiver 100 is implemented in more than one integrated circuit of an integrated circuit device which may include a multichip package containing the integrated circuits.

In some embodiments, the controller 120 of the format module 105 includes hardware components. For example, the controller 120 may include a central processing unit (CPU), a microprocessor, a microcontroller, an embedded processor, an embedded controller, combinational logic circuits, synchronous logic circuits, or the like. In some embodiments, the controller 120 includes software components. For example, the controller 120 may include computing instructions, such as a computer program for controlling operation of the format module 105. In some embodiments, the controller 120 of the format module 105 includes firmware components. For example, the controller 120 may included a non-volatile memory, as a read-only memory (ROM), including computing instructions or data structures.

In some embodiments, the data receiver 100 implements the alignment symbol indicator 110, the bit order selector 115, the symbol validity indicator 125, the bit order indicator 130, the bit polarity indicator 135, or some combination thereof, by using interrupts. In some embodiments, the data receiver 100 implements the alignment symbol indicator 110, the bit order selector 115, the symbol validity indicator 125, the bit order indicator 130, the bit polarity indicator 135, or some combination thereof, by using a polling technique. In various embodiments, the data receiver 100 includes timers or counters, or both, for generating the alignment symbol indicator 110, the bit order selector 115, the symbol validity indicator 125, the bit order indicator 130, the bit polarity indicator 135, or some combination thereof.

FIG. 2 illustrates the bit manipulation module 165, in accordance with an embodiment of the present invention. In this embodiment, the bit manipulation module 165 includes a bit order module 215 and a bit polarity module 225 coupled to the bit order module 215. The bit order module 215 receives the symbol stream 160 generated by the symbol alignment module 155 and generates a symbol stream 220 by selectively reversing the bit order of symbols in the symbol stream 160 based on the bit order indicator 130. If the bit order indicator 130 indicates that symbols in the parallel data stream 150 are reversed with respect to the predetermined bit order of the data receiver 100, the bit order module 215 generates the symbol stream 220 by reversing the bit order of symbols in the symbol stream 160. Otherwise, if the bit order indicator 130 indicates that symbols in the parallel data stream 150 are not reversed with respect to the predetermined bit order of the data receiver 100, the bit order module 215 generates the symbol stream 220 by passing the symbol stream 160 as the symbol stream 220.

The bit polarity module 225 receives the symbol stream 220 generated by the bit order module 215 and generates the symbol stream 170 by selectively inverting (i.e., logically negating) the bit polarity of symbols of the symbol stream 220 based on the bit polarity indicator 135. If the bit polarity indicator 135 indicates that symbols in the symbol stream 170 are inverted with respect to the predetermined bit polarity of the data receiver 100, the bit polarity module 225 inverts the bit polarity of symbols in the symbol stream 220. Otherwise, if the bit polarity indicator 135 indicates that symbols of the symbol stream 170 are not inverted with respect to the predetermined bit polarity of the data receiver 100, the bit polarity module 225 passes the symbol stream 220 as the symbol stream 170.

As illustrated in FIG. 2, the bit manipulation module 165 includes a bit processing pipeline 200 including a pipeline stage 205 (i.e., a first pipeline stage 205) and a pipeline stage 210 (i.e., a second pipeline stage 210) following the pipeline stage 205. The pipeline stage 205 and the pipeline stage 210 are synchronized by a clock signal in the data receiver 100. In this embodiment, the pipeline stage 205 includes the bit order module 215, and the pipeline stage 210 includes the bit polarity module 225. In this way, the bit polarity module 225 follows the bit order module 215 in the bit processing pipeline 200. Moreover, the bit order module 215 outputs a number of symbols of the symbol stream 220 in a clock cycle of the clock signal and the bit polarity module 225 outputs a same number of symbols of the symbol stream 170 in the same clock cycle. For example, the bit order module 215 may output one symbol of the symbol stream 220 in a clock cycle and the bit polarity module 225 may output one symbol of the symbol stream 170 in the same clock cycle.

FIG. 3 illustrates the bit manipulation module 165, in accordance with an embodiment of the present invention. In this embodiment, the bit manipulation module 165 includes the bit order module 215 and the bit polarity module 225. Moreover, the bit order module 215 is coupled to the bit polarity module 225. The bit polarity module 225 receives the symbol stream 160 generated by the symbol alignment module 155 and generates a symbol stream 300 by selectively inverting (i.e., logically negating) the bit polarity of symbols in the symbol stream 160 based on the bit polarity indicator 135. If the bit polarity indicator 135 indicates that the bit polarity of symbols of the parallel data stream 150 are inverted with respect to the predetermined bit polarity of the data receiver 100, the bit polarity module 225 inverts the bit polarity of symbols in the symbol stream 160. Otherwise, if the bit polarity indicator 135 indicates that the bit polarity of symbols in the parallel data stream 150 are not inverted with respect to the predetermined bit polarity of the data receiver 100, the bit polarity module 225 generates the symbol stream 300 by passing the symbol stream 160 as the symbol stream 300.

The bit order module 215 receives the symbol stream 300 generated by the bit polarity module 225 and generates the symbol stream 170 by selectively reversing the bit order of symbols in the symbol stream 300 based on the bit order indicator 130. If the bit order indicator 130 indicates that the bit order of symbols in the parallel data stream 150 are reversed with respect to the predetermined bit order of the data receiver 100, the bit order module 215 generates the symbol stream 170 by reversing the bit order of symbols in the symbol stream 300. Otherwise, if the bit order indicator 130 indicates that the bit order of symbols in the parallel data stream 150 are not reversed with respect to the predetermined bit order of the data receiver 100, the bit order module 215 generates the symbol stream 170 by passing the symbol stream 300 as the symbol stream 170.

Additionally, the bit manipulation module 165 of FIG. 3 includes the bit processing pipeline 200 including the pipeline stage 205 (i.e., a first pipeline stage 205) and the pipeline stage 210 (i.e., a second pipeline stage 210) following the pipeline stage 205. The pipeline stage 205 and the pipeline stage 210 are synchronized by a clock signal in the data receiver 100. In this embodiment, the pipeline stage 205 includes the bit polarity module 225, and the pipeline stage 210 includes the bit order module 215. In this way, the bit order module 215 follows the bit polarity module 225 in the bit processing pipeline 200. Moreover, the bit polarity module 225 outputs a number of symbols of the symbol stream 300 in a clock cycle of the clock signal and the bit order module 215 outputs a number of symbols of the symbol stream 170 in the same clock cycle. For example, the bit polarity module 225 may output one symbol of the symbol stream 300 in a clock cycle and the bit order module 215 may output one symbol of the symbol stream 170 in the same clock cycle.

Figure 4:
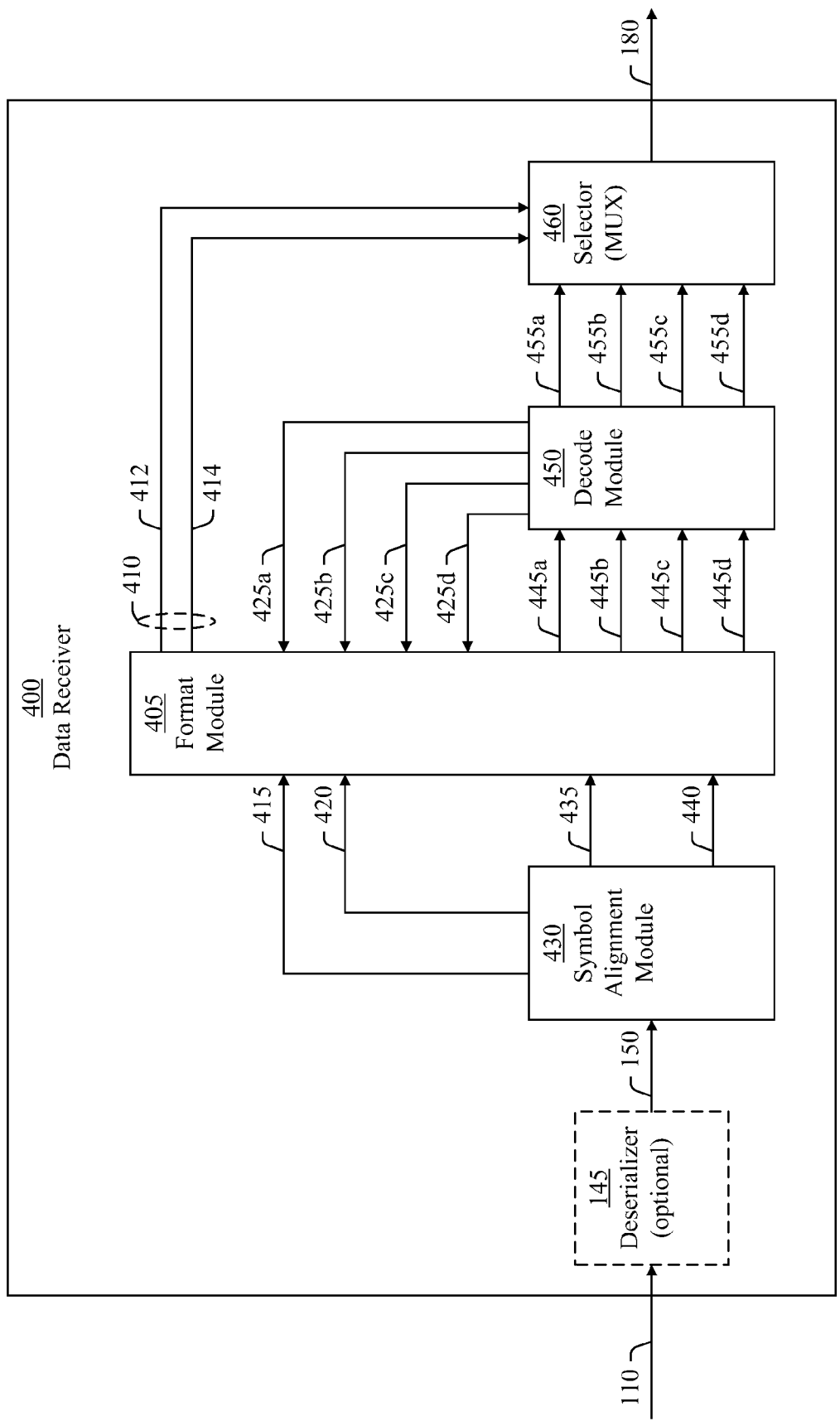
FIG. 4 is a block diagram of a data receiver, in accordance with an embodiment of the present invention.

FIG. 4 illustrates a data receiver 400, in accordance with an embodiment of the present invention. In this embodiment, the data receiver 400 includes a format module 405, a symbol alignment module 430, a decode module 450, and a selector (MUX) 460. The format module 405 is coupled (e.g., connected) to both the symbol alignment module 430 and the decode module 450. Additionally, the decode module 450 is coupled (e.g., connected) to the selector 460. In some embodiments, the data receiver 400 also includes the deserializer 145. In embodiments including the deserializer 145, the deserializer 145 is coupled (e.g., connected) to the symbol alignment module 430. Moreover, the deserializer 145 generates the parallel data stream 150 based on the serial data stream 140. In embodiments without the deserializer 145, the data receiver 400 receives the parallel data stream 150. For example, the deserializer 145 may be external of the data receiver 400. Further in this example, the deserializer 145 generates the parallel data stream 150 based on the serial data stream 140.

The symbol alignment module 430 monitors the parallel data stream 150 for both forward alignment symbols (i.e., alignment symbols having a forward bit order) and reverse alignment symbols (i.e., alignment symbols having a reverse bit order). Furthermore, the symbol alignment module 430 identifies an alignment symbol in the parallel data stream 150 and generates a symbol stream 435 (i.e., a forward symbol stream 435) and a symbol stream 440 (i.e., a reverse symbol stream 440) based on the parallel data stream 150. If the symbol alignment module 430 identifies a forward alignment symbol in the parallel data stream 150, the symbol alignment module 430 generates the symbol stream 435 by aligning symbols in the parallel data stream 150 based on the forward alignment symbol identified in the parallel data stream 150. Otherwise, if the symbol alignment module 430 identifies a reverse alignment symbol in the parallel data stream 150, the symbol alignment module 430 generates the symbol stream 440 by aligning symbols in the parallel data stream 150 based on the reverse alignment symbol identified in the parallel data stream 150.

In some embodiments, the symbol alignment module 430 generates an alignment symbol indicator 415 corresponding to the symbol stream 435 and indicating whether the parallel data stream 150 includes a forward alignment symbol. Because the symbol alignment module 430 generates the symbol stream 435 based on the parallel data stream 150, the alignment symbol indicator 415 also indicates whether the symbol stream 435 includes a forward alignment symbol. The symbol alignment module 430 also generates an alignment symbol indicator 420 corresponding to the symbol stream 440 and indicating whether the parallel data stream 150 includes a reverse alignment symbol. Because the symbol alignment module 430 generates the symbol stream 440 based on the parallel data stream 150, the alignment symbol indicator 420 also indicates whether the symbol stream 440 includes a reverse alignment symbol.

The format module 405 generates symbol streams 445a and 445b based on the symbol stream 435 generated by the symbol alignment module 430 and generates symbol streams 445c and 445d based on the symbol stream 440 generated by the symbol alignment module 430. The symbol stream 445a has the same bit order and the same bit polarity of the parallel data stream 150. The symbol stream 445b has the same bit order but the opposite bit polarity (i.e., inverted bit polarity) of the parallel data stream 150. The symbol stream 445c has the opposite bit order (i.e., reverse bit order) but the same bit polarity of the parallel data stream 150. The symbol stream 445b has the opposite bit order and the opposite bit polarity of the parallel data stream 150. Moreover, one of the symbol streams 445a-d has the predetermined bit order and the predetermined bit polarity of the data receiver 400.

Additionally, the format module 405 receives symbol validity indicators 425a-d from the decode module 450. The symbol validity indicators 425a-d correspond to the symbol streams 445a-d and indicate whether the corresponding symbol streams 445a-d are valid, as is described more fully herein. The format module 405 generates a symbol stream indicator 410 based on the symbol validity indicators 425a-d. The symbol stream indicator 410 indicates which of the symbol streams 445a-d has the predetermined bit order and the predetermined bit polarity of the data receiver 400. In some embodiments, the symbol stream indicator 410 includes a bit order indicator 412 and a bit polarity indicator 414. In these embodiments, the bit order indicator 412 indicates the bit order of the parallel data stream 150 and the bit polarity indicator 414 indicates the bit polarity of the parallel data stream 150.

In various embodiments, the format module 405 determines which of the symbol streams 445a-d has the predetermined bit order and the predetermined bit polarity of the data receiver 400 based on the alignment symbol indicators 415 and 420 as well as the symbol validity indicators 425a-d. In these embodiments, the alignment symbol indicator 415 corresponds to the symbol streams 445a and 445b, and the alignment symbol indicator 420 corresponds to the symbol streams 445c and 445d. The format module 405 determines whether a symbol stream 445 is valid if the corresponding symbol validity indicator 425 indicates the symbol stream 445 is valid and the corresponding alignment symbol indicator (e.g., alignment symbol indicator 415 or 420) indicates the parallel data stream 150 includes an alignment symbol. In this way, the format module 405 confirms that a symbol stream 445 is valid based on the corresponding alignment symbol indicator (e.g., alignment symbol indicator 415 or 420).

In some cases, the format module 405 may determine that more than one symbol stream 445 is valid. In these cases, the format module 405 selects one of the symbol streams 445 and generates the symbol stream indicator 410 indicating the selected symbol stream 445. For example, the format module 405 may identify two or more symbol validity indicators 425 indicating that the corresponding symbol streams 445 are valid and select one of those symbol streams 445 having the lowest count of invalid symbols.

The decode module 450 generates the symbol validity indicators 425 (i.e., symbol validity indicators 425a-d) based on the symbol streams 445 (i.e., symbol streams 445a-d) generated by the format module 405. In various embodiments, the decode module 450 identifies invalid symbols in the symbol streams 445 according to a communication protocol of the data receiver 400 and maintains a count of invalid symbols identified in each of the symbol stream 445 in a time period (e.g., a predetermined time period). Additionally, the decode module 450 determines whether any count maintained for the symbol streams 445 has reached a threshold value in that time period. If a count of a symbol stream 445 has not reached the threshold in the time period, the decode module 450 generates the symbol validity indicator 425 corresponding to the symbol stream 445 indicating that the symbol stream 445 is valid. Otherwise, if the count of the symbol stream 445 has reached the threshold in the time period, the decode module 450 generates the symbol validity indicator 425 corresponding to the symbol stream 445 indicating that symbol stream 445 is not valid (i.e., invalid).

The selector 460 selects a symbol stream 455 (i.e., a decoded symbol stream 445) generated by the decode module 450 based on the symbol stream indicator 410 and passes the selected symbol stream 455 as the formatted symbol stream 180. In this way, the format module 105 selects the formatted symbol stream 180 having the predetermined bit order and the predetermined bit polarity of data receiver 400 regardless of the bit order and the bit polarity of symbols in the parallel data stream 150.

In some embodiments, the data receiver 400 implements the alignment symbol indicator 415, the alignment symbol indicator 420, the bit order indicator 412, the bit polarity indicator 414, or the symbol validity indicators 425, or some combination thereof, by using interrupts. In some embodiments, the data receiver 400 implements the alignment symbol indicator 415, the alignment symbol indicator 420, the bit order indicator 412, the bit polarity indicator 414, or the symbol validity indicators 425, or some combination thereof, by using a polling technique. In various embodiments, the data receiver 400 includes timers or counters, or both, for generating the alignment symbol indicator 415, the alignment symbol indicator 420, the bit order indicator 412, the bit polarity indicator 414, or the symbol validity indicators 425, or some combination thereof.

Figure 5:
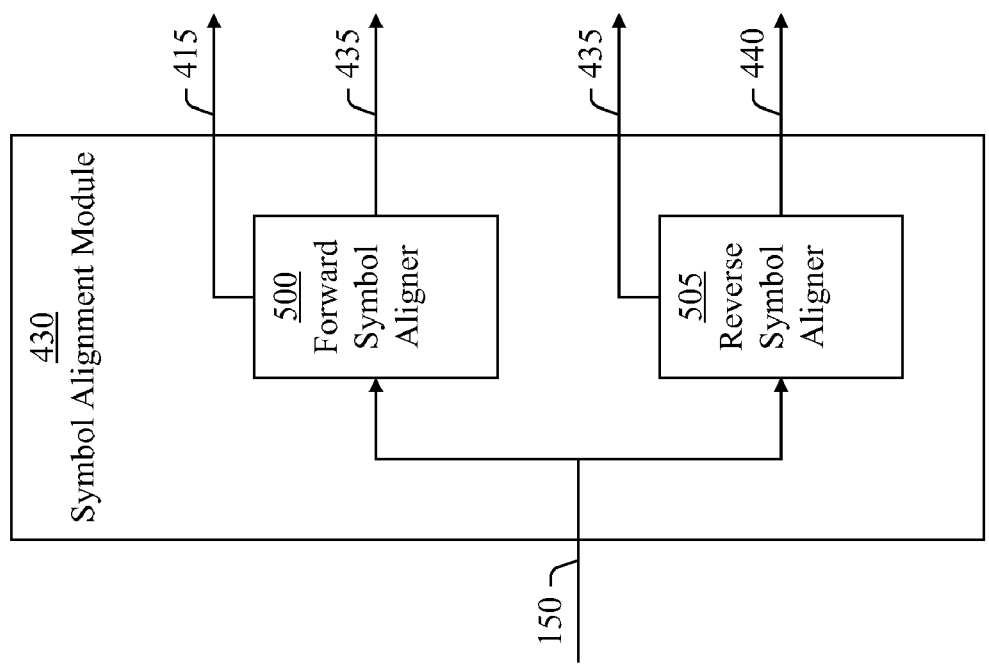
FIG. 5 is a block diagram of a symbol alignment module, in accordance with an embodiment of the present invention.

FIG. 5 illustrates the symbol alignment module 430, in accordance with an embodiment of the present invention. In this embodiment, the symbol alignment module 430 includes a forward symbol aligner 500 and a reverse symbol aligner 505. The forward symbol aligner 500 monitors the parallel data stream 150 for forward alignment symbols, and generates the alignment symbol indicator 415 indicating whether the parallel data stream 150 includes a forward alignment symbol. In this process, the forward symbol aligner 500 monitors the parallel data steam 150 for both non-inverted forward alignment symbols and inverted forward alignment symbols. In various embodiments, the forward alignment symbol may have a little endian format or a big endian format.

If the forward symbol aligner 500 identifies a forward alignment symbol in the parallel data stream 150, the forward symbol aligner 500 generates the symbol stream 435 by aligning symbols in the parallel data stream 150 based on the forward alignment symbol identified in the parallel data stream 150. Because the alignment symbol identified in the parallel data stream 150 may be a non-inverted forward alignment symbol or an inverted forward alignment symbol, the symbol stream 435 generated by the forward symbol aligner 500 may have a non-inverted bit polarity or an inverted bit polarity with respect to the predetermined bit polarity of the data receiver 400. Otherwise, if the forward symbol aligner 500 does not identify a forward alignment symbol in the parallel data stream 150, the forward symbol aligner 500 generates the symbol stream 435 including symbols that may be invalid or may not be aligned to an alignment boundary according to a communication protocol of the data receiver 400.

Figure 6:
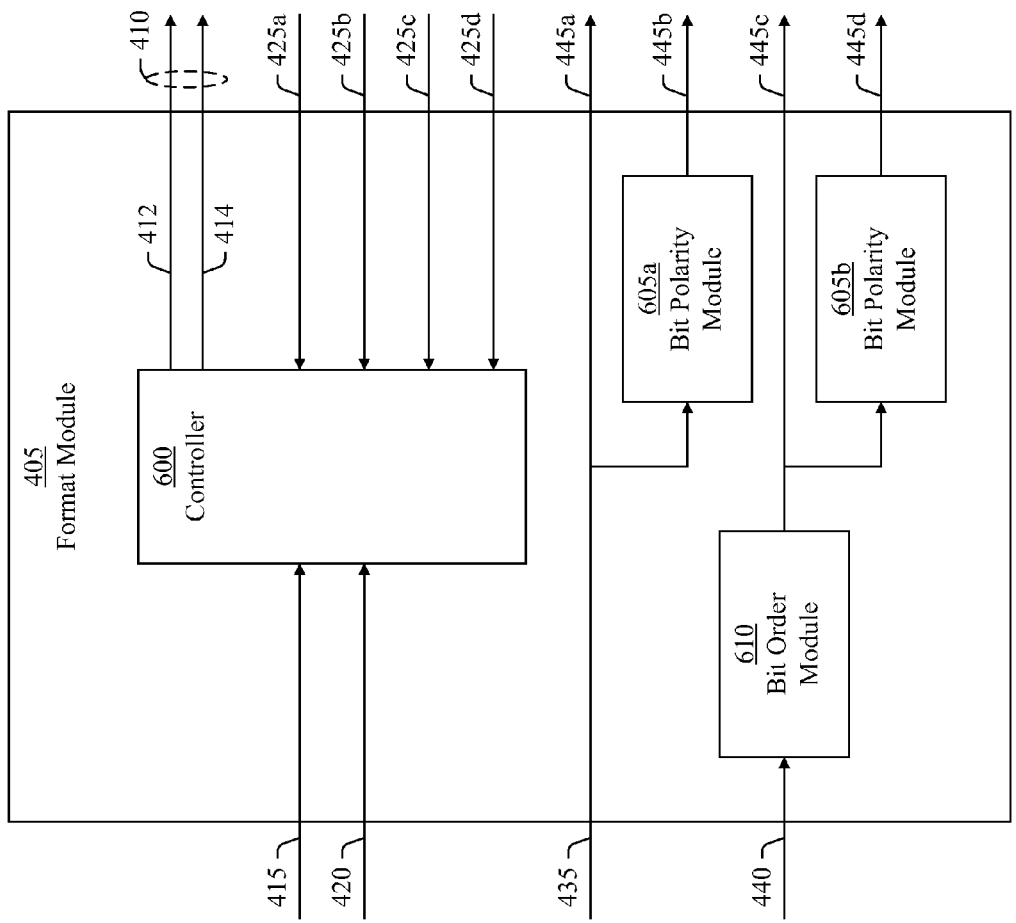
FIG. 6 is a block diagram of a format module, in accordance with an embodiment of the present invention.

The reverse symbol aligner 505 monitors the parallel data stream 150 for reverse alignment symbols and generates the alignment symbol indicator 435 indicating whether the parallel data stream 150 includes a reverse alignment symbol. In this process, the reverse symbol aligner 505 monitors the parallel data stream 150 for both non-inverted reverse alignment symbols and inverted reverse alignment symbols. If the reverse symbol aligner 505 identifies a reverse alignment symbol in the parallel data stream 150, the reverse symbol aligner 505 generates the symbol stream 440 by aligning symbols in the parallel data stream 150. Because the alignment symbol identified in the parallel data stream 150 may be a non-inverted reverse alignment symbol or an inverted reverse alignment symbol, and because the reverse symbol aligner 505 reverses the bit order of symbols in the parallel data stream 150, the symbol stream 440 generated by the reverse symbol aligner 505 may have a non-inverted bit polarity or an inverted bit polarity with respect to the predetermined bit polarity of the data receiver 400. Otherwise, if the reverse symbol aligner 505 does not identify a reverse alignment symbol in the parallel data stream 150, the reverse symbol aligner 505 generates the symbol stream 440 including symbols that may be invalid or may not be aligned to an alignment boundary according to a communication protocol of the data receiver 400. FIG. 6 illustrates the format module 405, in accordance with an embodiment of the present invention. The format module 405 includes a controller 600, bit polarity modules 605 (e.g., bit polarity modules 605a and 605b), and a bit order module 610. The controller 600 generates the symbol stream indicator 410 based on the symbol validity indicators 425, as is discussed more fully herein. In some embodiments, the controller 600 generates the symbol stream indicator 410 based on the alignment symbol indicators 415 and 420 as well as the symbol validity indicators 425, as is also described more fully herein.

The format module 405 passes the symbol stream 435, which is generated by the symbol alignment module 430, as the symbol stream 445a. The bit polarity module 605a generates the symbol stream 445b by inverting the bit polarity of the symbol stream 435. The bit order module 610 generates the symbol stream 445c by reversing the bit order of symbols in the symbol stream 440 generated by the symbol alignment module 430. The bit polarity module 605b generates the symbol stream 445d by inverting the bit polarity of the symbol stream 445c.

In some embodiments, the controller 600 of the format module 405 includes hardware components. For example, the controller 600 may include may include a central processing unit (CPU), a microprocessor, a microcontroller, an embedded processor, an embedded controller, combinational logic circuits, synchronous logic circuits, or the like. In some embodiments, the controller 600 includes software components. For example, the controller 600 may include computing instructions, such as a computer program for controlling operation of the format module 405. In some embodiments, the controller 600 of the format module 105 includes firmware components. For example, the controller 600 may included a non-volatile memory, as a read-only memory (ROM), including computing instructions or data structures.

Figure 7:
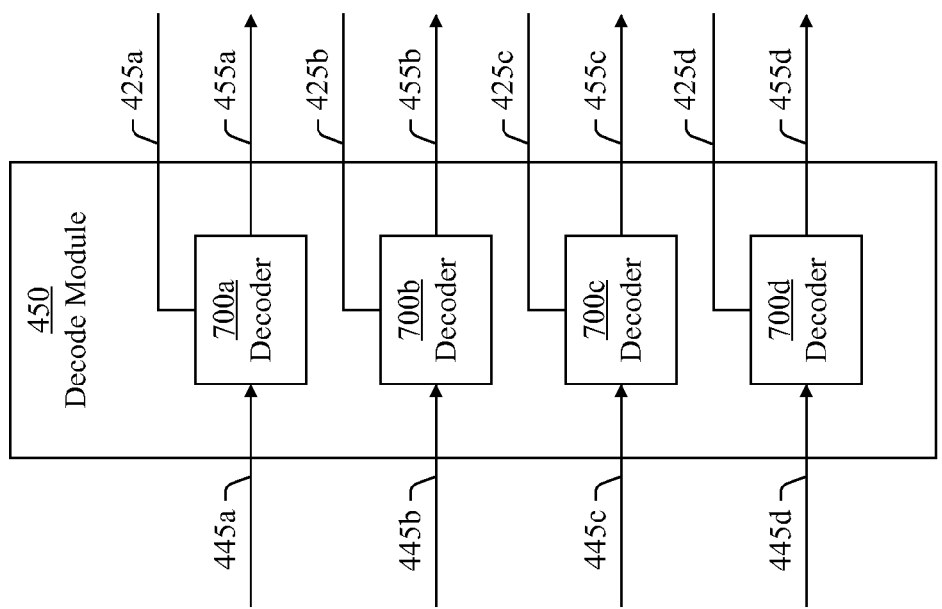
FIG. 7 is a block diagram of a decode module, in accordance with an embodiment of the present invention.

FIG. 7 illustrates the decode module 450, in accordance with an embodiment of the present invention. The decode module 450 includes decoders 700 (i.e., decoders 700a-d) corresponding to the symbol streams 445 (i.e., the symbol streams 445a-d), the symbol streams 455 (i.e., the symbol streams 455a-d), and the symbol validity indicators 425 (i.e., the symbol validity indicators 425a-d). Each of the decoders 700 generates the corresponding symbol stream 455 by decoding symbols in the corresponding symbol stream 445 generated by the format module 405. Additionally, each of the decoders 700 monitors the corresponding symbol stream 445 generated by the format module 405 for invalid symbols according to a communication protocol of the data receiver 400. Moreover, the decoder 700 generates the corresponding symbol validity indicator 425 based on a count of any invalid symbols identified in the corresponding symbol stream 445, as is described more fully herein.

Figure 8:
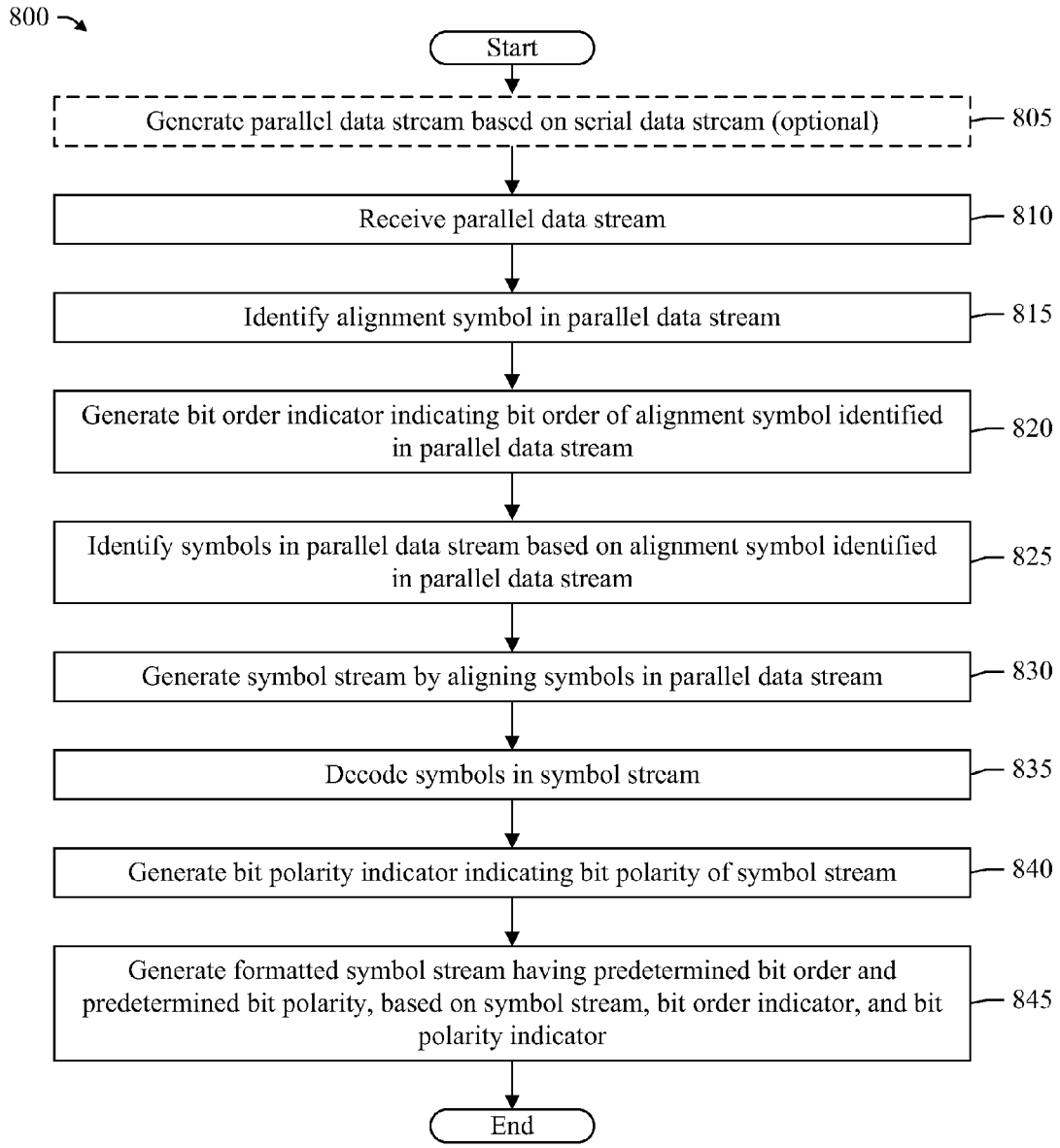
FIG. 8 is a flow chart for a method of formatting symbols in a data stream, in accordance with an embodiment of the present invention.

FIG. 8 illustrates a method 800 of formatting symbols in a data stream, in accordance with an embodiment of the present invention. In optional step 805, a parallel data stream is generated based on a serial data stream. In various embodiments, the deserializer 145 generates the parallel data stream 150 based on the serial data stream 140 by deserializing the serial data stream 140. In this process, the deserializer 145 groups data bits of the serial data stream 140 into data units of the parallel data stream 150. The method 800 then proceeds to step 810.

In step 810, a parallel data stream is received. In various embodiments, the symbol alignment module 155 of the data receiver 100 receives the parallel data stream 150. In some embodiments, the symbol alignment module 430 of the data receiver 400 receives the parallel data stream 150. The method 800 then proceeds to step 815.

In step 815, an alignment symbol is identified in the parallel data stream. In various embodiments, the symbol alignment module 155 identifies an alignment symbol in the parallel data stream 150. Moreover, the symbol alignment module 155 monitors the parallel data stream 150 for both forward alignment symbols (i.e., alignment symbols having a forward bit order) and reverse alignment symbols (i.e., symbols having a reverse bit order), and identifies the alignment symbol by identifying either a forward alignment symbol or a reverse alignment symbol in the parallel data stream 150. In other embodiments, the symbol alignment module 430 identifies an alignment symbol in the parallel data stream 150 by identifying either a forward alignment symbol or a reverse alignment symbol in the parallel data stream 150. The method 800 then proceeds to step 820.

In step 820, a bit order indicator is generated indicating a bit order of the alignment symbol identified in the parallel data stream. In various embodiments, the format module 105 generates a bit order indicator 130 indicating the bit order of the alignment symbol identified in the parallel data stream 150 based on the alignment symbol indicator 110. In some embodiments, the format module 405 generates the symbol stream indicator 410 based on the symbol validity indicators 425. In these embodiments, the symbol stream indicator 410 functions as a bit order indicator. For example, the symbol stream indicator 410 may include a bit order indicator 412 indicating the bit order of the alignment symbol identified in the parallel data stream 150. The method 800 then proceeds to step 825.

In step 825, symbols are identified in the parallel data stream based on the alignment symbol identified in the parallel data stream. In various embodiments, the symbol alignment module 155 identifies symbols in the parallel data stream 150 based on the alignment symbol identified in the parallel data stream 150. In some embodiments, the symbol alignment module 430 identifies symbols in the parallel data stream 150 based on the alignment symbol identified in the parallel data stream 150. The method 800 then proceeds to step 830.

In step 830, a symbol stream is generated by aligning symbols in the parallel data stream. In various embodiments, the symbol alignment module 155 generates the symbol stream 160 by aligning symbols in the parallel data stream 150 based on the alignment symbol identified in the parallel data stream 150. In some embodiments, the symbol alignment module 430 generates the symbol stream 435 and the symbol stream 440 based on the alignment symbol identified in the parallel data stream 150. In these embodiments, the symbol alignment module 430 aligns symbols in the symbol stream 435 if the alignment symbol identified in the parallel data stream 150 is a forward alignment symbol. Otherwise, the symbol alignment module 430 aligns symbols in the symbol stream 440 if the alignment symbol identified in the parallel data stream 150 is a reverse alignment symbol. The method 800 then proceeds to step 835.

In step 835, symbols are decoded in the symbol stream. In various embodiments, the decode module 175 decodes symbols in the symbol stream 170. In some embodiments, the decode module 450 decodes symbols in the symbol streams 445 (i.e., the symbol streams 445a-d). The method 800 then proceeds to step 840.

In step 840, a bit polarity indicator indicating the bit polarity of the alignment symbol identified in the symbol stream is generated. In various embodiments, the format module 105 generates a bit polarity indicator 135 indicating the bit polarity of the alignment symbol identified in the symbol stream 160. In some embodiments, the format module 405 generates the symbol stream indicator 410 based on the symbol validity indicators 425. In these embodiments, the symbol stream indicator 410 functions as a bit polarity indicator. For example, the symbol stream indicator 410 may include a bit polarity indicator 414 indicating the bit polarity of the alignment symbol identified in the parallel data stream 150. The method 800 then proceeds to step 845.

In step 845, a formatted symbol stream having a predetermined bit order and a predetermined bit polarity is generated based on the symbol stream, the bit order indicator, and the bit polarity indicator. In various embodiments, the decode module 175 generates the formatted symbol stream 180 having a predetermined bit order and a predetermined bit polarity of the data receiver 100. In these embodiments, the format module 105 generates the symbol stream 170 having both the predetermined bit order and the predetermined bit polarity of the data receiver 100 by selectively modifying data bits in the symbol stream 160 generated by the symbol alignment module 155 based on bit order indicator 130 and the bit polarity indicator 135. In turn, the decode module 175 generates the formatted symbol stream 180 including the decoded symbols and having the predetermined bit order and the predetermined bit polarity of the data receiver 100. In this way, the decode module 175 generates the formatted symbol stream 180 based on the symbol stream 160, the bit order indicator 130, and the bit polarity indicator 135.

In some embodiments, the format module 405 generates the symbol streams 445 based on the symbol streams 435 and 440 generated by the symbol alignment module 430. In turn, the decode module 450 generates the formatted symbol stream 180 by generating the symbol streams 455 based on the symbol streams 445. In these embodiments, the symbol stream 445 generated by the decode module 450 which has the predetermined bit order and the predetermined bit polarity of the data receiver 400 is the formatted symbol stream. Moreover, the selector 460 selects the symbol stream 445 having the predetermined bit order and the predetermined bit polarity of the data receiver 400 based on the symbol stream indicator 410 and passes the selected symbol stream 445 as the formatted symbol stream 180. The method 800 then ends.

In various embodiments, the method 800 may include more or fewer than the steps 805-845 illustrated in FIG. 8 and described above. In some embodiments, the steps 805-845 of the method 800 may be performed in a different order than the order illustrated in FIG. 8 and described above. In some embodiments, some of the steps 805-845 of the method 800 may be performed in parallel or substantially simultaneously. In various embodiments, one or more of the steps 805-845 may be performed more than once in the method 800.

Figure 9:
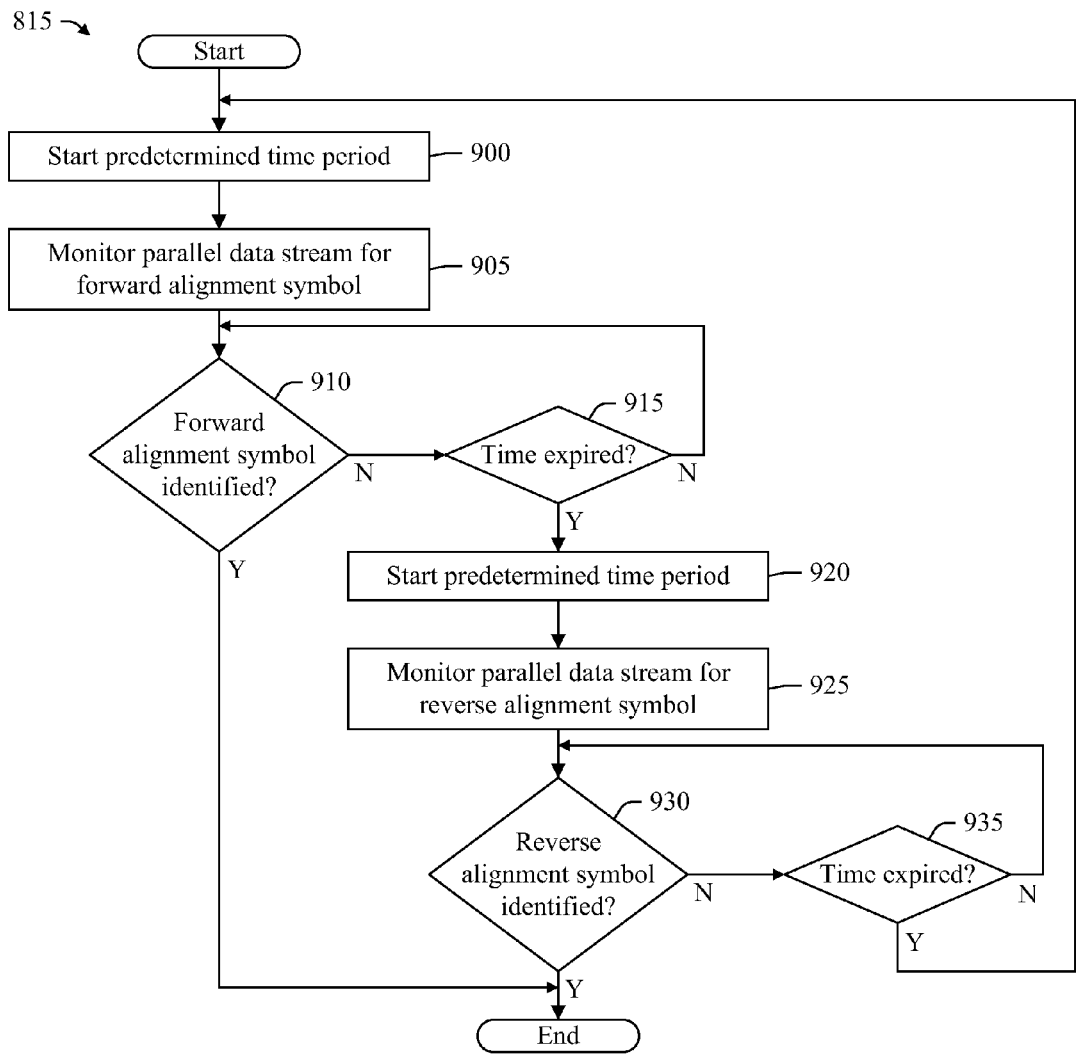
FIG. 9 is a flow chart for a portion of a method of formatting symbols in a data stream, in accordance with an embodiment of the present invention.

FIG. 9 illustrates a portion of the method 800 of formatting symbols in a data stream, in accordance with an embodiment of the present invention. The portion of the method 800 illustrated in FIG. 9 is an embodiment of the step 815 of the method 800, in which an alignment symbol is identified in the parallel data stream. In step 900, a predetermined time period is started. In various embodiments, the format module 105 of the data receiver 100 starts a predetermined time period (e.g., a first predetermined time period). For example, the controller 120 in the format module 105 may start a timer in the data receiver 100. In other embodiments, another component of the data receiver 100, such as the symbol alignment module 155, may start the predetermined time period. The portion of the method 800 then proceeds to step 905.

In step 905, the parallel data stream is monitored for a forward alignment symbol. In various embodiments, the symbol alignment module 155 monitors the parallel data stream 150 for a forward alignment symbol. The portion of the method 800 then proceeds to step 910.

In step 910, it is determined whether a forward alignment symbol is identified in the parallel data stream. In various embodiments, the symbol alignment module 155 determines whether a forward alignment symbol is identified in the parallel data stream 150. If the symbol alignment module 155 determines that the parallel data stream 150 includes a forward alignment symbol, the symbol alignment module 155 generates the alignment symbol indicator 110 indicating that the parallel data stream 150 includes an alignment symbol and the portion of the method 800 ends. Otherwise, the symbol alignment module 155 generates the alignment symbol indicator 110 indicating that the parallel data stream 150 does not include an alignment symbol and the portion of the method 800 proceeds to step 915.

In step 915, it is determined whether the predetermined time period has expired. In various embodiments, the format module 105 determines whether the predetermined time period has expired. For example, the controller 120 of the format module 105 may determine whether a timer in the data receiver 100 has expired. In other embodiments, another component of the data receiver 100, such as the symbol alignment module 155, may determine whether the predetermined time period has expired. If the predetermined time period has expired, the portion of the method 800 proceeds to step 920. Otherwise, the portion of the method 800 returns to step 910.

In step 920, a predetermined time period is started. In various embodiments, the controller 120 of the format module 105 starts the predetermined time period (e.g., a second predetermined time period). For example, the controller 120 of the format module 105 may start a timer in the data receiver

100. In other embodiments, another component of the data receiver 100, such as the symbol alignment module 155, may start the predetermined time period. The portion of the method 800 then proceeds to step 925.

In step 925, the parallel data stream is monitored for a reverse alignment symbol. In various embodiments, the symbol alignment module 155 monitors the parallel data stream 150 for a reverse alignment symbol. The portion of the method 800 then proceeds to step 930.

In step 930, it is determined whether a reverse alignment symbol is identified in the parallel data stream. In various embodiments, the symbol alignment module 155 determines whether a reverse alignment symbol is identified in the parallel data stream 150. If the symbol alignment module 155 determines that the parallel data stream 150 includes a reverse alignment symbol, the symbol alignment module 155 generates the alignment symbol indicator 110 indicating that the parallel data stream 150 includes an alignment symbol and the portion of the method 800 ends. Otherwise, the symbol alignment module 155 generates the alignment symbol indicator 110 indicating that the parallel data stream 150 does not include an alignment symbol and the portion of the method 800 proceeds to step 935.

In step 935, it is determined whether the predetermined time period has expired. In various embodiments, the format module 105 determines whether the predetermined time period has expired. For example, the controller 120 of the format module 105 may determine whether a timer in the data receiver 100 has expired. In other embodiments, another component of the data receiver 100, such as the symbol alignment module 155, may determine whether the predetermined time period has expired. If the predetermined time period has expired, the portion of the method 800 returns to step 900. Otherwise, the portion of the method 800 returns to step 930.

In various embodiments, the portion of the method 800 illustrated in FIG. 9 may include more or fewer than the steps 900-935 illustrated in FIG. 9 and described above. In some embodiments, the steps 900-935 of the portion of the method 800 illustrated in FIG. 9 may be performed in a different order than the order illustrated in FIG. 9 and described above. In some embodiments, some of the steps 900-935 of the portion of the method 800 illustrated in FIG. 9 may be performed in parallel or substantially simultaneously. In various embodiments, one or more of the steps 900-935 may be performed more than once in the portion of the method 800 illustrated in FIG. 9.

Figure 10:
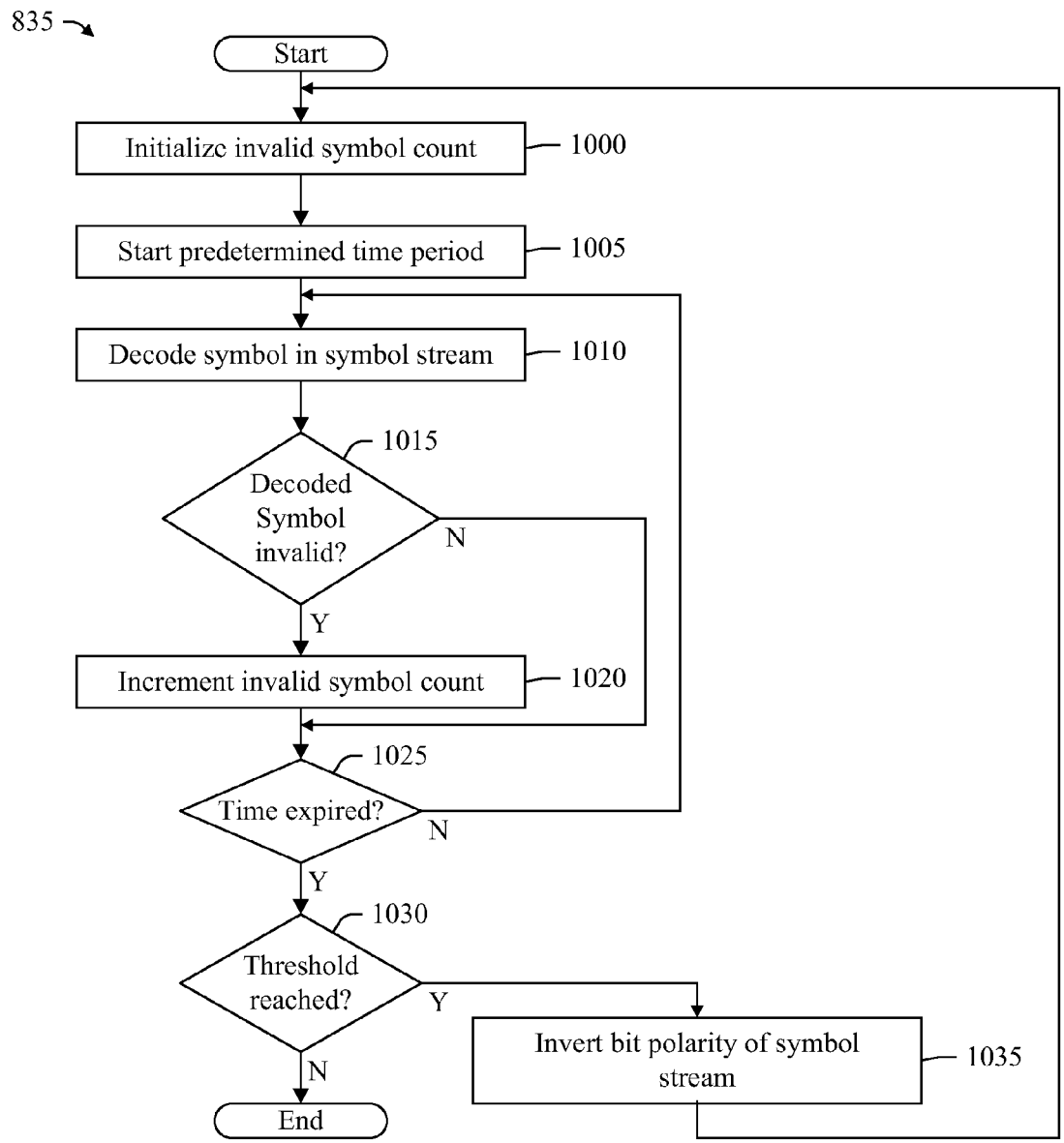
FIG. 10 is a flow chart for a portion of a method of formatting symbols in a data stream, in accordance with an embodiment of the present invention.

FIG. 10 illustrates a portion of the method 800 of formatting symbols in a data stream, in accordance with an embodiment of the present invention. The portion of the method 800 illustrated in FIG. 10 is an embodiment of the step 835 of the method 800, in which symbols are decoded in the symbol stream. In step 1000, an invalid symbol count is initialized. In various embodiments, the decode module 175 initializes an invalid symbol count. For example, the decode module 175 may set the invalid symbol count to a value of zero. In other embodiments, another component of the data receiver 100, such as the format module 105, may initialize the invalid symbol count. The portion of the method 800 then proceeds to step 1005.

In step 1005, a predetermined time period is started. In various embodiments, the format module 105 starts a predetermined time period (e.g., a first predetermined time period). For example, the controller 120 may start a timer in the data receiver 100. In other embodiments, another component of the data receiver 100, such as the symbol alignment module 155, may start the predetermined time period. The portion of the method 800 then proceeds to step 1010.

In step 1010, a symbol is decoded in the symbol stream. In various embodiments, the decode module 175 decodes a symbol in the symbol stream 170. In this process, the decode module 175 generates a decoded symbol based on the symbol in the symbol stream 170. The portion of the method 800 then proceeds to step 1015.

In step 1015, it is determined whether the decoded symbol is invalid. In various embodiments, the decode module 175 determines whether the decoded symbol is invalid. If the decode module 175 determines that the decoded symbol is invalid, the portion of the method 800 proceeds to step 1020. Otherwise, if the decode module 175 determines that the decoded symbol is not invalid (i.e., valid), the portion of the method 800 proceeds to step 1025.

In step 1020, arrived at from the determination in step 1015 that the decoded symbol is invalid, the invalid symbol count is incremented. In various embodiments, the decode module 175 increments the invalid symbol count. In other embodiments, another component of the data receiver 100, such as the format module 105, may increment the invalid symbol count. The portion of the method 800 then proceeds to step 1025.

In step 1025, arrived at from the determination in step 1015 that the decoded symbol is valid (i.e., not invalid) or from step 1020 in which the invalid symbol count is incremented, it is determined whether the predetermined time period has expired. In various embodiments, the format module 105 determines whether the predetermined time period has expired. For example, the controller 120 of the format module 105 may determine whether a timer in the data receiver 100 has expired. In other embodiments, another component of the data receiver 100, such as the decode module 175, may determine whether the predetermined time period has expired. If the predetermined time period has expired, the portion of the method 800 proceeds to step 1030. Otherwise, the portion of the method 800 returns to step 1010.

In step 1030, arrived at from the determination in step 1025 that the predetermined time period has expired, it is determined whether the invalid symbol count exceeds a threshold. In various embodiments, the decode module 175 determines whether the invalid symbol count exceeds a threshold. If the invalid symbol count does not exceed the threshold, the portion of the method 800 ends. Otherwise, if the invalid symbol count exceeds the threshold, the portion of the method 800 proceeds to step 1035.

In step 1035, the bit polarity of the symbol stream is inverted. In various embodiments, the format module 105 inverts the bit polarity of the symbol stream 170. For example, the format module 105 may generate the symbol stream 170 by inverting the bit polarity of data bits in the symbol stream 160. In some embodiments, the controller 120 of the format module 105 generates the bit polarity indicator 135 indicating an inverted bit polarity and the bit manipulation module 165 inverts the bit polarity of the symbol stream 170. The portion of the method 800 then returns to step 1000.

In various embodiments, the portion of the method 800 illustrated in FIG. 10 may include more or fewer than the steps 1000-1035 illustrated in FIG. 10 and described above. In some embodiments, the steps 1000-1035 of the portion of the method 800 illustrated in FIG. 10 may be performed in a different order than the order illustrated in FIG. 10 and described above. In some embodiments, some of the steps 1000-1035 of the portion of the method 800 illustrated in FIG. 10 may be performed in parallel or substantially simultaneously. In various embodiments, one or more of the steps 1000-1035 may be performed more than once in the portion of the method 800 illustrated in FIG. 10.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A system for formatting symbols in a data stream, the system comprising:
   a symbol alignment module configured to receive a parallel data stream, identify an alignment symbol in the parallel data stream, identify symbols in the parallel data stream based on the alignment symbol identified in the parallel data stream, and generate a symbol stream by aligning the symbols identified in the parallel data stream;
   a decode module configured to decode symbols in the symbol stream; and
   a format module configured to generate a bit order indicator indicating a bit order of the parallel data stream based on the alignment symbol identified in the parallel data stream, and generate a bit polarity indicator indicating a bit polarity of the parallel data stream based on the decoded symbols, the decode module further configured to generate a formatted symbol stream having a predetermined bit order and a predetermined bit polarity, based on the symbol stream, the bit order indicator, and the bit polarity indicator.

2. The system of claim 1, wherein the symbol alignment module is further configured to identify the alignment symbol in the parallel data stream by monitoring the parallel data stream for a forward alignment symbol in a first predetermined time period, determining the parallel data stream does not include the forward alignment symbol in the first predetermined time period, reversing a bit order of symbols in the parallel data stream after determining the parallel data stream does not include the forward alignment symbol in the first predetermined time period, monitoring the parallel data stream for a reverse alignment symbol in a second predetermined time period following the first predetermined time period, and determining the parallel data stream includes the reverse alignment symbol in the second predetermined time period.

3. The system of claim 1, wherein the decode module is further configured to decode symbols in the symbol stream by generating a first invalid symbol count indicating a number of the decoded symbols that are invalid in a first predetermined time period, determining the first invalid symbol count has reached a threshold, inverting the bit polarity of the symbol stream, generating a second invalid symbol count indicating a number of the decoded symbols that are invalid in a second predetermined time period following the first predetermined time period, and determining the second invalid symbol count has not reached the threshold.

4. The system of claim 1, wherein the symbol alignment module is further configured to identify the alignment symbol in the parallel data stream by identifying either a forward alignment symbol or a reverse alignment symbol in the parallel data stream.

5. The system of claim 4, wherein the symbol alignment module is further configured to generate a forward symbol stream by aligning symbols in the parallel data stream based on the forward alignment symbol, and generate a reverse symbol stream by aligning symbols in the parallel data stream based on the reverse alignment symbol.

6. The system of claim 5, wherein the format module is further configured to generate a plurality of symbol streams based on the forward symbol stream and the reverse symbol stream, the plurality of symbol streams including a first symbol stream having a forward bit order and a non-inverted bit polarity, a second symbol stream having a forward bit order and an inverted bit polarity, a third symbol stream having a reverse bit order and a non-inverted bit polarity, and a fourth symbol stream having a reverse bit order and an inverted bit polarity.

7. The system of claim 6, wherein the decode module is further configured to generate a plurality of decoded symbol streams corresponding to the plurality of symbol streams by decoding symbols in the plurality of symbol streams, the system further comprising a selector configured to select a decoded symbol stream of the plurality of decoded symbol streams as the formatted symbol stream based on the bit order indicator and the bit polarity indicator.

8. The system of claim 1, further comprising a deserializer configured to receive a serial data stream and to generate the parallel data stream by deserializing the serial data stream.

9. The system of claim 1, wherein the format module comprises a bit processing pipeline including a plurality of pipeline stages, wherein a pipeline stage of the plurality of pipeline stages includes a bit order module configured to reverse a bit order of symbols in the symbol stream based on the bit order indicator, and another pipeline stage of the plurality of pipeline stages includes a bit polarity module configured to invert the bit polarity of the symbol stream based on the bit polarity indicator.

10. A method of formatting symbols in a data stream, the method comprising:
    receiving a parallel data stream;
    identifying an alignment symbol in the parallel data stream;
    generating a bit order indicator indicating a bit order of the parallel data stream based on the alignment symbol identified in the parallel data stream;
    identifying symbols in the parallel data stream based on the alignment symbol identified in the parallel data stream;
    generating a symbol stream by aligning the symbols identified in the parallel data stream;
    decoding symbols in the symbol stream;
    generating a bit polarity indicator indicating a bit polarity of the parallel data stream based on the decoded symbols; and
    generating a formatted symbol stream having a predetermined bit order and a predetermined bit polarity, based on the symbol stream, the bit order indicator, and the bit polarity indicator.

11. The method of claim 10, wherein identifying the alignment symbol in the parallel data stream comprises:
    monitoring the parallel data stream for a forward alignment symbol in a first predetermined time period;
    determining the parallel data stream does not include the forward alignment symbol in the first predetermined time period;
    monitoring the parallel data stream for a reverse alignment symbol in a second predetermined time period following the first predetermined time period;
    determining the parallel data stream includes the reverse alignment symbol in the second predetermined time period; and
    reversing a bit order of symbols in the symbol stream after determining the parallel data stream does not include the forward alignment symbol in the first predetermined time period.

12. The method of claim 10, wherein decoding symbols in the symbol stream comprises:

generating a first invalid symbol count indicating a number of the decoded symbols that are invalid in a first predetermined time period;

determining the first invalid symbol count has reached a threshold;

inverting the bit polarity of the symbol stream in response to determining the first invalid symbol count has reached the threshold;

generating a second invalid symbol count indicating a number of the decoded symbols that are invalid in a second predetermined time period following the first predetermined time period; and determining the second invalid symbol count has not reached the threshold.

13. The method of claim 10, wherein identifying the alignment symbol in the parallel data stream comprises identifying either a forward alignment symbol or a reverse alignment symbol in the parallel data stream.

14. The method of claim 13, wherein generating the symbol stream by aligning symbols in the parallel data stream comprises:

generating a forward symbol stream by aligning symbols in the parallel data stream based on a forward alignment symbol; and generating a reverse symbol stream by aligning symbols in the parallel data stream based on a reverse alignment symbol.

15. The method of claim 14, wherein generating the symbol stream comprises generating a plurality of symbol streams based on the forward symbol stream and the reverse symbol stream, the plurality of symbol streams including a first symbol stream having a forward bit order and a non-inverted bit polarity, a second symbol stream having a forward bit order and an inverted bit polarity, a third symbol stream having a reverse bit order and a non-inverted bit polarity, and a fourth symbol stream having a reverse bit order and an inverted bit polarity.

16. The method of claim 15, wherein generating the formatted symbol stream comprises:

generating a plurality of decoded symbol streams corresponding to the plurality of symbol streams by decoding symbols in the plurality of symbol streams; and selecting a decoded symbol stream of the plurality of decoded symbol streams as the formatted symbol stream based on the bit order indicator and the bit polarity indicator.

17. The method of claim 10, further comprising:
receiving a serial data stream; and
generating the parallel data stream by deserializing the serial data stream.

18. A method of formatting symbols in a data stream, the method comprising:

receiving a parallel data stream;

identifying an alignment symbol in the parallel data stream by identifying either a forward alignment symbol having a forward bit order in the parallel data stream or a reverse alignment symbol having a reverse bit order in the parallel data stream;

generating a bit order indicator indicating whether the parallel data stream has a forward bit order or a reverse bit order based on the alignment symbol identified in the parallel data stream;

identifying symbols in the parallel data stream based on the alignment symbol identified in the parallel data stream;

generating a symbol stream by aligning the symbols identified in the parallel data stream;

decoding symbols in the symbol stream;

generating a bit polarity indicator indicating whether the parallel data stream has a non-inverted bit polarity or an inverted bit polarity based on the decoded symbols; and generating a formatted symbol stream having a predetermined bit order and a predetermined bit polarity, based on the symbol stream, the bit order indicator, and the bit polarity indicator.

19. The method of claim 18, wherein identifying the alignment symbol in the parallel data stream comprises:

monitoring the parallel data stream for a forward alignment symbol in a first predetermined time period;

determining the parallel data stream does not include the forward alignment symbol in the first predetermined time period;

monitoring the parallel data stream for a reverse alignment symbol in a second predetermined time period following the first predetermined time period;

determining the parallel data stream includes the reverse alignment symbol in the second predetermined time period; and reversing a bit order of symbols in the symbol stream after determining the parallel data stream does not include the forward alignment symbol in the first predetermined time period.

20. The method of claim 19, wherein decoding symbols in the symbol stream comprises:

generating a first invalid symbol count indicating a number of the decoded symbols that are invalid in a first predetermined time period;

determining the first invalid symbol count has reached a threshold;

inverting the bit polarity of the symbol stream in response to determining the first invalid symbol count has reached the threshold;

generating a second invalid symbol count indicating a number of the decoded symbols that are invalid in a second predetermined time period following the first predetermined time period; and determining the second invalid symbol count has not reached the threshold.

\* \* \* \* \*